(12) United States Patent
Henry et al.

(10) Patent No.: US 10,051,774 B2
(45) Date of Patent: Aug. 21, 2018

(54) COMMON LIFT/LOWER GROUND ENTRANCE POINT

(71) Applicant: CNH Industrial Canada, Ltd., Saskatoon (CA)

(72) Inventors: James W. Henry, Saskatoon (CA); Mark J. Wileniec, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/267,578

(22) Filed: Sep. 16, 2016

(65) Prior Publication Data
US 2018/0077850 A1 Mar. 22, 2018

(51) Int. Cl.
*A01B 63/32* (2006.01)
*A01B 79/00* (2006.01)

(52) U.S. Cl.
CPC ............ *A01B 63/32* (2013.01); *A01B 79/005* (2013.01)

(58) Field of Classification Search
CPC ..... A01B 69/008; A01B 63/32; A01B 79/005; B60G 9/00; B62D 12/00; E01H 1/0845
See application file for complete search history.

(56) References Cited

U.S. PATENT DOCUMENTS

| 4,044,838 | A | | 8/1977 | Wooldridge | |
| 4,176,721 | A | | 12/1979 | Poggemiller et al. | |
| 4,179,770 | A | * | 12/1979 | Nunes, Jr. | E01H 1/0845 15/360 |
| 4,518,044 | A | | 5/1985 | Wiegardt et al. | |
| 4,646,620 | A | | 3/1987 | Buchl | |
| 4,802,545 | A | * | 2/1989 | Nystuen | B62D 12/00 180/419 |
| 5,261,495 | A | | 11/1993 | Szymczak | |
| 5,810,095 | A | | 9/1998 | Orbach et al. | |
| 5,911,669 | A | | 6/1999 | Stentz et al. | |
| 6,044,921 | A | * | 4/2000 | Lansberry | B60G 9/00 180/6.48 |
| 6,058,342 | A | | 5/2000 | Orbach et al. | |
| 6,068,064 | A | | 5/2000 | Bettin | |
| 6,085,846 | A | | 7/2000 | Buchl et al. | |
| 6,336,051 | B1 | | 1/2002 | Pangels et al. | |
| 6,647,328 | B2 | | 11/2003 | Walker | |
| 6,701,857 | B1 | | 3/2004 | Jensen et al. | |
| 7,437,230 | B2 | * | 10/2008 | McClure | A01B 69/008 701/23 |
| 7,686,095 | B2 | | 3/2010 | Batthala et al. | |
| 8,857,530 | B2 | | 10/2014 | Henry | |
| 2004/0124605 | A1 | | 7/2004 | McClure et al. | |
| 2008/0177449 | A1 | | 7/2008 | Pickett et al. | |
| 2011/0153168 | A1 | | 6/2011 | Peterson et al. | |

* cited by examiner

*Primary Examiner* — McDieunel Marc
(74) *Attorney, Agent, or Firm* — Rebecca L. Henkel; Rickard K. DeMille

(57) ABSTRACT

A traction unit drawn agricultural implement for treating a field along repeated generally parallel longitudinal swaths has a hydraulic system for lifting and lowering a ground engaging implement portion at the beginning and end respectively of each swath. A system for aligning the beginning of one swath with the termination of the previous swath determines initial lift and lower times and adjusts the hydraulic system to bring the times into closer conformity.

16 Claims, 4 Drawing Sheets

COMMON LIFT/LOWER GROUND ENTRANCE POINT

BACKGROUND OF THE INVENTION

1. Field of the Invention

The present invention relates to agricultural implements and, more particularly, to a technique for fully utilizing headland at the ends of repeated implement swaths in a field tilling, planting or similar operation.

2. Description of the Related Art

A typical planting or tilling operation on a large generally rectangular field involves repeated passes of a tractor or other traction unit drawn implement. The operator follows a long generally straight path from one field end to the other and returns along a generally parallel path with minimal overlap. The operation is suspended at the completion of each swath while the operator makes a 180 degree turn preparing for the return trip. Frequently, this suspension involves raising and subsequent lowering of the implement. The tractor hydraulic system usually operates with a fixed flow rate. The time required to lift the implement is greater than the time required to lower the implement. When lowering, the weight of the implement assists hydraulic flow and pressure while lifting requires a higher pressure to overcome the implement weight. This results in misalignment of ground entrance and exit locations which, in turn, results in a need for greater headland spacing and an increase in overlaps The operation may utilize GPS information to determine the beginning and end locations of the swaths, however, the beginning of one swath may still fail to coincide with the end of the adjacent swaths.

A typical planting or tilling operation may also employ techniques for remotely controlling the depth of penetration into the soil of a planting or tilling tool. For example, U.S. Pat. No. 8,857,530 discloses an automatic depth control system for an agricultural implement employing a depth control cylinder which is configured to adjust a penetration depth of a ground engaging tool of the implement by varying a height of a ground engaging wheel. In addition, the agricultural implement system includes a sensor communicatively coupled to a fluid control unit and configured to output signals indicative of the penetration depth of the ground engaging tool. The fluid control unit is configured to automatically control fluid flow to the depth control cylinder based on the signals to maintain a user-selectable penetration depth. The sensor may take on a variety of forms. For example, a potentiometer configured to measure rotation of a wheel lifting and lowering arm relative to the implement frame is suitable. A linear potentiometer coupled to the depth control cylinder and configured to measure a position of a rod extending from the depth control cylinder, or a transducer configured to measure a position of the frame relative to a soil surface may be employed.

What is needed in the art is a system for aligning the beginning of one swath with the termination of the previous swath.

SUMMARY OF THE INVENTION

The present invention provides maximized field use with minimum required headland by equalizing the time require to lift and the time required to lower an implement.

The invention in one form is directed to a traction unit drawn agricultural implement for treating a field by repeated longitudinal passes along generally parallel swaths. The implement has a hydraulic control system for raising at least a portion of the implement at the end of each swath and lowering the portion at the beginning of each swath. The alignment of the beginning of one swath with the termination of the previous swath is improved by determining the time required to lift the implement portion at the termination of one swath, determining the time to subsequently lower the implement portion at the beginning of an adjacent swath, and detecting any difference between the two determined times. The hydraulic control system is then adjusted to compensate for a detected difference between the times to bring the beginnings and ends of subsequent swaths into closer alignment.

The invention in another form is directed to an agricultural implement system including a ground engaging tool configured to engage soil in a working position and to disengage the soil in a non-working position along with a hydraulic arrangement for moving the tool between the working and non-working positions. A control system repetitively transitions the ground engaging tool between the working position and the non-working position. The control system determines the time required to transition from the working position to the non-working position and the time required to transition from the non-working position back to the working position. The hydraulic arrangement is adjusted to bring the two determined times into closer conformity.

In a still further form, the invention includes an agricultural implement system which has a fluid control unit and an implement having a frame, a ground engaging tool coupled to the frame, and a ground engaging wheel configured to support the frame during operation of the implement. There is a depth control cylinder fluidly coupled to the fluid control unit, wherein the depth control cylinder is configured to adjust a penetration depth of the ground engaging tool by varying a height of the ground engaging wheel relative to the frame. A sensor is communicatively coupled to the fluid control unit and configured to output signals indicative of the penetration depth of the ground engaging tool. The fluid control unit is configured to apply hydraulic fluid to the cylinder to repetitively lift the tool from a preferred operating depth at the termination of one traverse of a field to clear the ground and facilitate turning the agricultural implement, the fluid control unit subsequently applying hydraulic fluid to the cylinder to lower the tool to the preferred operating depth preparatory to an adjacent traverse of the field. The fluid control unit modifies the hydraulic force applied to the cylinder to lift the frame or the hydraulic force applied to the cylinder for lowering the frame to bring the beginnings and terminations of subsequent adjacent traverses into closer conformity with one another. The fluid control unit includes an electronic control unit responsive to sensor signals to determine the time required to lift the frame and to determine the time required to lower the frame. The electronic control unit computes the difference between the two determined times and provides a corrective signal to the fluid control unit.

An advantage of the present invention is more complete utilization of field space for crop production.

Another advantage is the beginning and ending of adjacent field swaths are closely aligned.

Yet another advantage is equalization of lifting time and lower time for a retractable implement may be controlled manually, initiated manually and completed automatically, or performed fully automatically.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
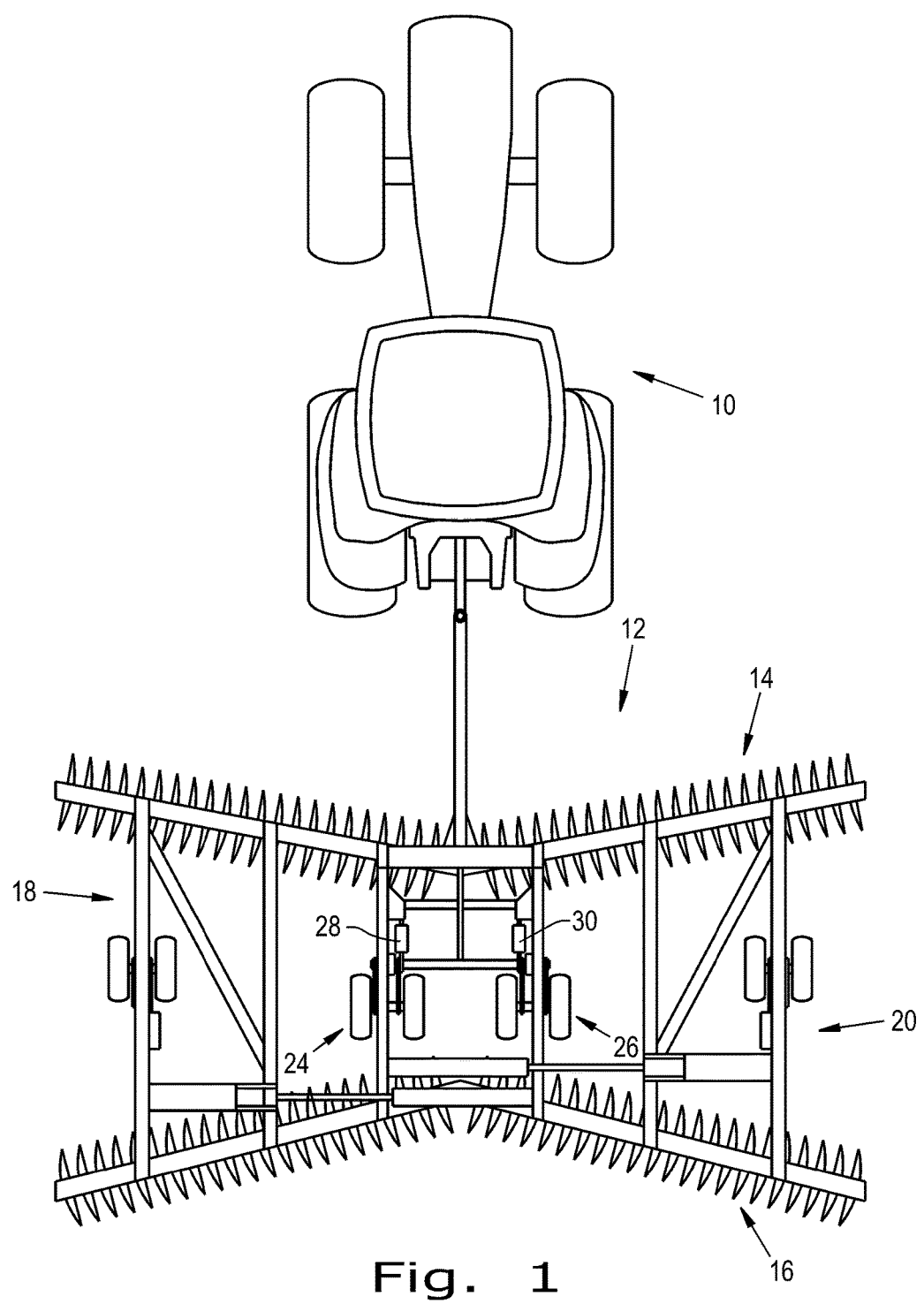
FIG. 1 is a top plan view of a traction unit drawn tilling implement incorporating the invention in one form.
Figure 2:
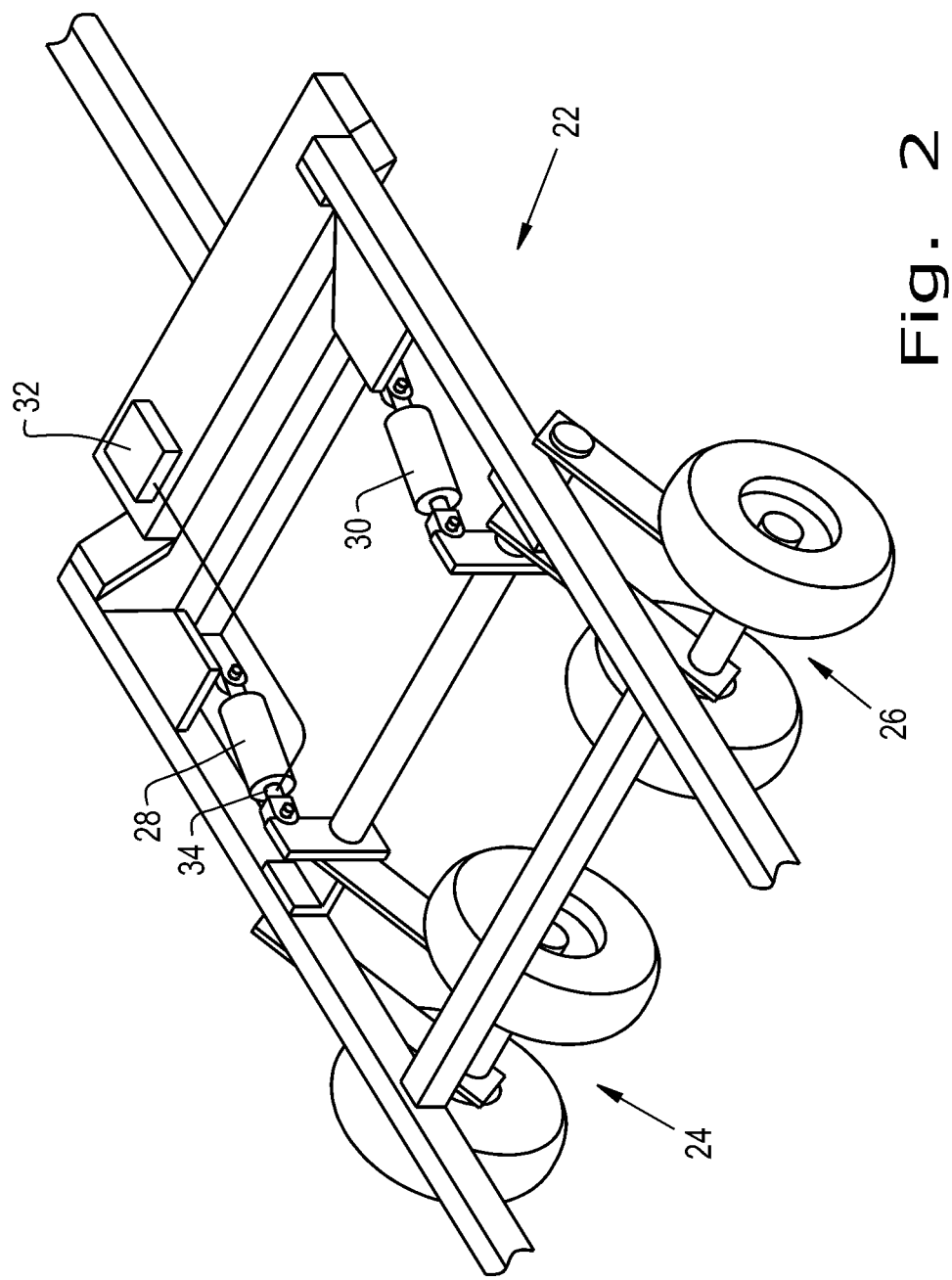
FIG. 2 is an isometric view of the support frame structure of the implement of FIG. 1.

Referring now to the drawings, and more particularly to FIG. 1, there is shown an exemplary traction unit 10 drawn agricultural implement 12 in the form of a field cultivator having leading 14 and trailing 16 sets of rotatable disks for tilling soil. The implement 12 may have laterally extending wing portions 18 and 20 which may be folded upward and inward from their illustrated field tilling positions to a compact transport position. While illustrated as sets of disks, the implement may take on other forms such as a planter, harrow, or other suitable ground engaging tool. The implement rests on a frame 22 as shown in FIG. 2.

Implement frame 22 is supported by retractable sets of wheels 24 and 26 which are raised and lowered under the control of hydraulic cylinders 28 and 30 respectively. The cylinder pistons are extended to lower the sets of wheels and retracted to raise the wheels. The implement frame has an electronic control unit (ECU) 32 coupled with a sensor 34. Sensor 34 monitors cylinder 28 and provides an output signal indicative of the current cylinder condition, that is, extended, retracted or any amount of intermediate extension. Sensor 34 may be of any suitable type. A linear potentiometer the resistance of which indicates the piston rod position may, by known techniques, be used to provide a position indicative voltage to the ECU. Thus, the sensor output also indicates the degree to which the sets of wheels are extended. With the wheels completely extended, the implement is out of contact with the ground. Partial retraction results in engagement and penetration into the ground. The depth of ground penetration is controlled by the hydraulic system shown in FIG. 3 and may be initially selected by the operator from within the traction unit 10.

Figure 3:
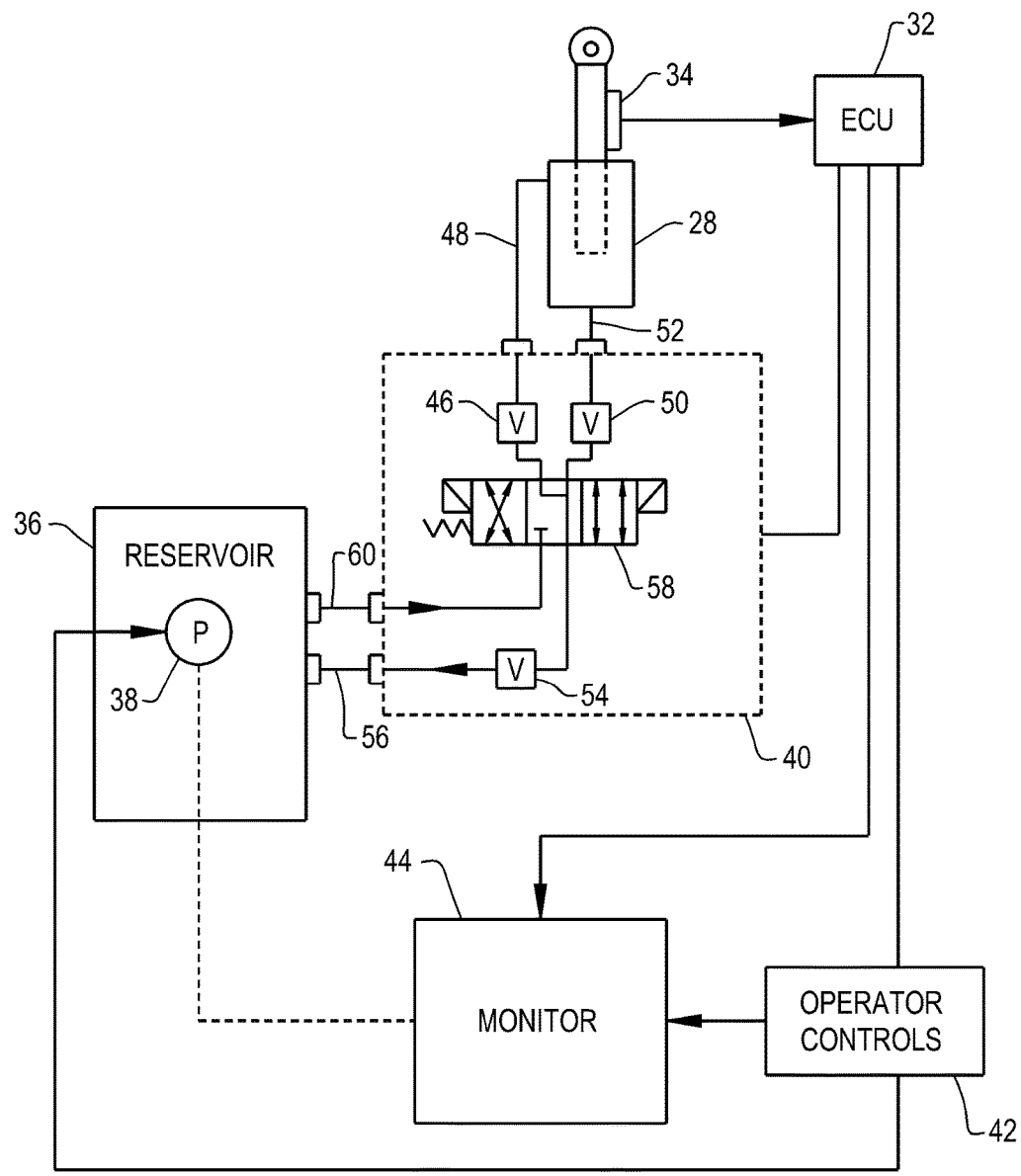
FIG. 3 is a schematic illustration of a hydraulic system utilizing the invention in one form.

In FIG. 3, the traction unit includes a fluid reservoir 36 and pump 38 as well as a set of control valves 40. The operator has access to a set of controls 42 and a system monitor or display 44 in the traction unit. The set of control valves 40 includes valve 46 in the rod side fluid line 48, valve 50 in the cap side fluid line 52, and valve 54 in the low pressure return line 56. A three position spool valve 58 couples both cap and rod side lines 48 and 52 to the low pressure return line 56 in the position shown. The valve 58 is solenoid actuable to the "straight through" position shown to the right. Here, high pressure fluid is supplied to the rod side of cylinder 28 to retract the piston rod, raising the wheels and lowering the implement. In the position illustrated to the left, pressurized fluid is supplied to the cap side of cylinder 28 and fluid is allowed to drain from the rod side resulting in a lowering of the wheels and lifting of the implement. The structure of FIG. 3 may comprise part of an automatic depth control system.

Figure 4B:
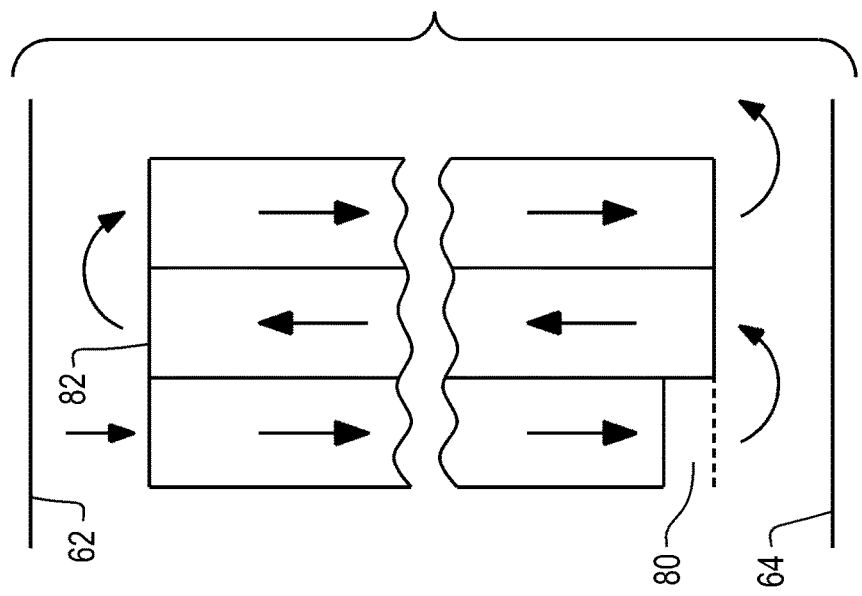
FIG. 4b is a plan view of a portion of a field showing adjacent swaths with the benefit of the present invention.
Figure 4A:
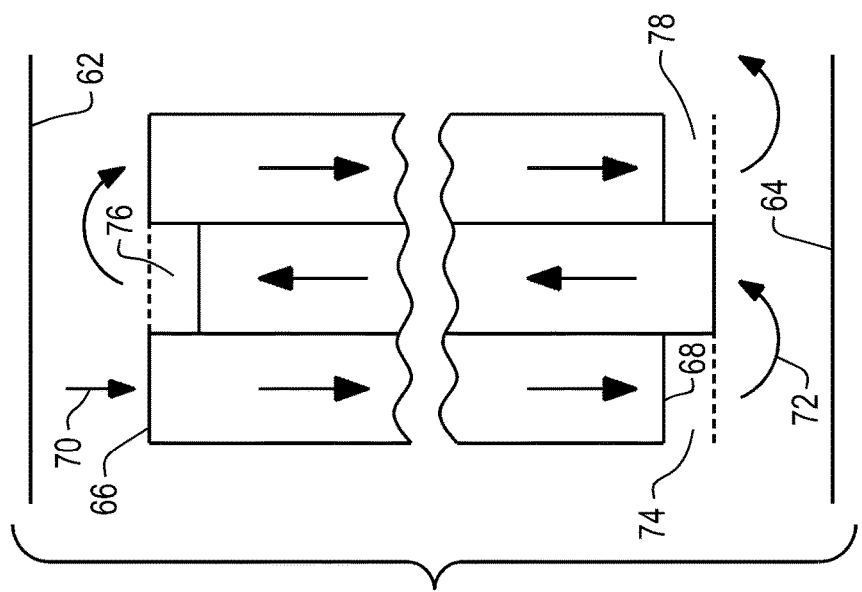
FIG. 4a is a plan view of a portion of a field showing adjacent swaths without benefit of the present invention.

In FIG. 4a, the field extremes, e.g., fence lines, are illustrated by the lines 62 and 64. Preparatory to a tilling, planting or similar operation, the implement operator selects a preferred depth of a suitable tool, e.g., to deposit seed at a preferred planting depth. The implement tool is moved to that depth and the sensor 34 output recorded for subsequent reference. The first swath begins at end 66 and terminates at end 68. The implement path is shown by arrows such as 70 and 72. Due to the shorter time required to lower the implement, the second swath begins a bit earlier leaving a dead space 74. This dead space or gap is repeated at the end of each swath as shown a 76 and 78.

In FIG. 4b a similar gap 80 occurs at the end of the first swath. The times required for the retraction of the implement and its redeployment are determined and the difference utilized to adjust the hydraulic control system to compensate for the detected difference between the times to bring the beginnings and ends of subsequent swaths into closer alignment. Thus, the second and subsequent swaths terminate as shown at 82 more fully utilizing the field space.

In some cases, the compensation may not fully align the beginnings and ends of the swaths. Repeating the determinations of lift and lower times for subsequent field passes will allow the compensation to be refined. The initial gap 80 may be avoided by cycling the lift and lower controls one or more times prior to commencing work on the field.

The hydraulic system includes control valves 40, reservoir 36 and pump 38. Adjustment to compensate for the detected difference in lift and lower times may be achieved by increasing the pump 38 output supplying increased hydraulic pressure to extend cylinder 28 and lift the implement. Adjustment may also be achieved by further opening of valve 50 or by restricting the exit flow through valve 46 or 54.

Traction units typically include an EHR (electro-hydraulic remote) valve for controlling the flow of hydraulic fluid to off-tractor actuators. Hydraulic movement between raised and lowered positions may be done automatically employing the ECU 32 to control the EHR valve using an ISOBus or other appropriate protocol for communication between the two electronic units. Automatic movement control may also be achieved based on a GPS signal. Hydraulic movement between raised and lowered positions may also be performed manually by the operator at previously determined swath beginning and end locations, e.g., the monitor 44 may be provided with a simple push button or other operator actuable raise/lower control.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for improving the alignment of the beginning of one swath with the termination of the previous swath, comprising the steps of:
    providing a traction unit drawn agricultural implement for treating a field by repeated longitudinal passes along generally parallel swaths, said implement having a hydraulic control system configured for raising at least a portion of the implement at an end of each swath and lowering the portion at a beginning of each swath, and said implement further including an electronic control unit;
    determining, by the electronic control unit, the time required to lift the implement portion at the termination of one swath;
    determining, by the electronic control unit, the time to subsequently lower the implement portion at the beginning of an adjacent swath;
    detecting, by the electronic control unit, any difference between the two determined times; and
    adjusting the hydraulic control system to compensate for a detected difference between the times to bring the beginnings and ends of subsequent swaths into closer alignment.

2. The method of claim 1, including a step of repeating the steps of determining the time required to lift the implement portion, determining the time to subsequently lower the implement portion, detecting any difference between the detected times, and adjusting the hydraulic control system for subsequent field swaths to refine the alignment of the swath ends.

3. The method of claim 1, wherein the steps of determining include utilizing GPS information defining the field ends.

4. The method of claim 1, wherein the steps of determining are both initiated by an implement operator.

5. The method of claim 1, wherein the implement includes a tool portion which is inserted into the ground at the beginning of each swath and lifted above ground at the termination of each swath.

6. The method of claim 5, wherein the implement includes a sensor for providing signals indicative of the position of the tool portion, the method including the steps of initially inserting the tool portion into the ground to a preferred operating depth and recording the sensor signal.

7. The method of claim 6, wherein the step of determining the time required to lift the implement portion includes monitoring the tool position signal to determine when the tool has been adequately raised from the ground.

8. The method of claim 6, wherein the step of determining the time required to lower the implement portion includes monitoring the tool position signal and comparing the positions signal with the recorded sensor signal to determine when the tool has reached the preferred operating depth.

9. An agricultural implement system, comprising:
    a ground engaging tool configured to engage soil in a working position and to disengage the soil in a non-working position;
    a hydraulic arrangement for moving the tool between the working and non-working positions; and
    a control system configured to repetitively transition the ground engaging tool between the working position and the non-working position, to determine the time required to transition from the working position to the non-working position, to determine the time required to transition from the non-working position back to the working position, and to adjust the hydraulic arrangement to bring the two determined times into closer conformity.

10. The agricultural implement system of claim 9, wherein the hydraulic arrangement comprises part of a depth control for the implement system.

11. The agricultural implement system of claim 9, wherein the implement includes a tool portion which is repeatedly inserted into the ground and lifted above ground, and a sensor for providing signals indicative of the position of the tool portion, whereby, the tool portion may be initially inserted the into the ground to a preferred operating depth and the sensor signal recorded.

12. The method of claim 11, wherein the time required to lift the implement portion is determined by monitoring the tool position signal to determine when the tool has been adequately raised from the ground.

13. The method of claim 11, wherein the time required to lower the implement portion is determined by monitoring the tool position signal and comparing the positions signal with the recorded sensor signal to determine when the tool has reached the preferred operating depth.

14. An agricultural implement system, comprising:
    a fluid control unit;
    an implement having a frame, a ground engaging tool coupled to the frame, and a ground engaging wheel configured to support the frame during operation of the implement;
    a depth control cylinder fluidly coupled to the fluid control unit, wherein the depth control cylinder is configured to adjust a penetration depth of the ground engaging tool by varying a height of the ground engaging wheel relative to the frame; and
    a sensor communicatively coupled to the fluid control unit and configured to output signals indicative of the penetration depth of the ground engaging tool, wherein:
    the fluid control unit is configured to apply hydraulic fluid to the cylinder to repetitively lift the tool from a preferred operating depth at the termination of one traverse of a field to clear the ground and facilitate turning the agricultural implement, the fluid control unit subsequently applying hydraulic fluid to the cylinder to lower the tool to the preferred operating depth preparatory to an adjacent traverse of the field;
    the fluid control unit modifying one of: the hydraulic force applied to the cylinder to lift the frame and the hydraulic force applied to the cylinder for lowering the frame to bring the beginnings and terminations of subsequent adjacent traverses into closer conformity with one another.

15. The agricultural implement system of claim 14, wherein the fluid control unit includes an electronic control unit responsive to sensor signals to determine the time required to lift the frame and to determine the time required to lower the frame, the electronic control unit computing the difference between the two determined times and providing a corrective signal to the fluid control unit.

16. The agricultural implement system of claim 14, wherein the hydraulic arrangement comprises part of a depth control for the implement system.

* * * * *